(12) United States Patent
Bourlon (10) Patent No.: US 11,371,967 B2
(45) Date of Patent: Jun. 28, 2022

(54) FLUID NETWORK FOR CONTROLLING AT LEAST ONE GASEOUS FLOW AND SYSTEM EMPLOYING SAID NETWORK

(71) Applicant: Commissariat A L'Energie Atomique et aux Energies Alternatives, Paris (FR)

(72) Inventor: Bertrand Bourlon, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 351 days.

(21) Appl. No.: 16/421,813

(22) Filed: May 24, 2019

(65) Prior Publication Data
US 2019/0360977 A1 Nov. 28, 2019

(30) Foreign Application Priority Data
May 25, 2018 (FR) ..................... 18 54423

(51) Int. Cl.
*G01N 30/16* (2006.01)
*G01N 30/00* (2006.01)
*G01N 30/02* (2006.01)

(52) U.S. Cl.
CPC ....... *G01N 30/16* (2013.01); *G01N 2030/008* (2013.01); *G01N 2030/025* (2013.01)

(58) Field of Classification Search
None
See application file for complete search history.

(56) References Cited

U.S. PATENT DOCUMENTS

| 4,912,051 A * | 3/1990 | Zaromb ............... G01N 1/2205 422/52 |
| 5,142,143 A * | 8/1992 | Fite ....................... G01M 3/202 250/281 |
| 7,615,189 B2 * | 11/2009 | Aslam ................... B82Y 30/00 422/50 |
| 10,113,983 B1 * | 10/2018 | Fine ......................... G01N 1/44 |
| 10,866,220 B2 * | 12/2020 | Gianchandani ........ G01N 30/78 |
| 2004/0056016 A1 | 3/2004 | Tian et al. |
| 2009/0211336 A1 | 8/2009 | Combes et al. |
| 2009/0308136 A1 | 12/2009 | Wang et al. |

(Continued)

OTHER PUBLICATIONS

French Preliminary Search Report dated Mar. 25, 2019 in French Application 18 54423, filed on May 25, 2018 (with English Translation of Categories of Cited Documents & Written Opinion).

(Continued)

*Primary Examiner* — Daniel S Larkin
(74) *Attorney, Agent, or Firm* — Oblon, McClelland, Maier & Neustadt, L.L.P.

(57) ABSTRACT

A fluid network controls a gaseous flow, the fluid network having several pre-concentration units including at least one first series in which the pre-concentration units are linked in series and each defined by a rank j in the series, with j ranging from 1 to m and m being greater than or equal to 2. Each pre-concentration unit of the network includes a cavity filled with an adsorbent material, at least one first fluid pathway emerging in the cavity, at least one second fluid pathway emerging in the cavity. Finally, each pre-concentration unit includes a component for heating the cavity.

14 Claims, 6 Drawing Sheets

(56) References Cited

U.S. PATENT DOCUMENTS

2011/0133070 A1* 6/2011 Taylor .................... G01N 1/40
250/282
2012/0090378 A1 4/2012 Wang et al.

OTHER PUBLICATIONS

Alfeeli, B. et al. "MEMS-Based Selective Preconcentration of Trace level Breath Analytes", IEEE Sensors Journal, vol. 9, No. 9, 2009, pp. 1068-1075.
Alfeeli, B. et al. "Evaluation of Tenax TA thin films as adsorbent material for micro preconcentration applications", Microchemical Journal 95, 2010, pp. 259-267.
Alfeeli, B, et al. "Selective Preconcentration by Temperature Manipulation of Cascaded Micro Preconcentrators", 2009 IEEE, pp. 1662-1665.

* cited by examiner

FLUID NETWORK FOR CONTROLLING AT LEAST ONE GASEOUS FLOW AND SYSTEM EMPLOYING SAID NETWORK

TECHNICAL FIELD OF THE INVENTION

The present invention relates to a fluid network for controlling at least one gaseous flow and to a system employing said fluid network. The fluid network comprises in particular several interlinked preconcentration units. The invention relates also to a method for separating gaseous compounds present in a gaseous flow.

STATE OF THE ART

As is known, a silicon preconcentration unit comprises a cavity filled with an adsorbent material and controlled heating means in order to establish a temperature in its cavity. This type of unit is in particular intended to receive a gaseous flow and makes it possible to block/store in its cavity compounds of the gaseous flow or to totally or partially release them. Such a unit, of low heat capacity, can in fact rapidly and with low power be controlled thermally. The temperature to which the unit is heated makes it possible to vary the constants of adsorption equilibrium of the compounds over the adsorbent phase. Tables make it possible in particular to indicate the compounds which will be fixed or salted out by a preconcentration unit according to the nature of the adsorbent used as well as the temperature set at the unit level.

The publication referenced "Alfeeli, B., Agah, M., MEMS-Based selective preconcentration of trace level breath analytes, (2009) IEEE Sensors Journal, 9 (9), art. no. 5191282, pp. 1068-1075" describes in particular the series-connection of two preconcentration units controlled individually in order in particular to be able to sort different compounds present in one and the same gaseous flow.

This earlier application does however prove fairly limited and it has been found that it could be appropriate to use such preconcentration units for more sophisticated applications for controlling a gaseous flow.

The patent applications US2009/308136A1 and US2004/056016A1 both describe preconcentrators with several compartments.

The aim of the invention is therefore to propose a fluid network which makes it possible to control at least one gaseous flow and to perform operations of addition, subtraction, filtration, reaction, movement, mixing type on one or more gaseous flows injected into said network.

SUMMARY OF THE INVENTION

This aim is achieved by a fluid network for controlling a gaseous flow comprising:
- a fluid inlet and a fluid outlet,
- several preconcentration units, each preconcentration unit of said network comprising:
  - a cavity filled with an adsorbent material,
  - at least one first fluid pathway emerging in said cavity,
  - at least one second fluid pathway emerging in said cavity,
  - means for heating said cavity,
- characterized in that, between the fluid inlet and the fluid outlet, the network comprises:
  - at least one first series of several preconcentration units that are linked in series, said preconcentration units of said first series being each defined by a rank j, with j ranging from 1 to m and m being greater than or equal to 2 and,
  - one or more other preconcentration units linked in parallel to the preconcentration units of said first series to form a matrix and/or an additional fluid link for short-circuiting one or more preconcentration units of the first series.

In the first case, there is thus at least one additional preconcentration unit of the network which is linked to a preconcentration unit of the first series which is situated at a rank lying between 2 and m−1.

In the second case, the additional fluid link can be a direct link, that is to say with no intermediate preconcentration unit, or via one or several other preconcentration unit or units of the network.

In a series of several preconcentration units, the first fluid pathway from the preconcentration unit of rank 1 is linked directly to the fluid inlet. For the units of rank j with j ranging from 2 to m−1, the first fluid pathway from any unit of rank j is linked to the second fluid pathway of the unit of rank j−1 and its second fluid pathway is linked to the first fluid pathway of the unit of rank j+1. The second fluid pathway from the unit of rank m is linked directly to the fluid outlet.

According to a particular embodiment, said first series comprises m preconcentration units, with m which is at least equal to three, and at least one preconcentration unit present from the rank 2 to m−1 comprises a third fluid pathway linked to another preconcentration unit of the network, distinct from those of the first series.

According to another particular embodiment, said first series of preconcentration units comprises m preconcentration units, with m which is at least equal to three, and at least one preconcentration unit present from the rank 2 to m−1 of said series comprises a third fluid pathway linked to a first preconcentration unit of the network distinct from those of the first series and a fourth fluid pathway linked to a second preconcentration unit of the network distinct from those of the first series and from said first preconcentration unit.

According to another particular embodiment, the network is organized in a matrix which comprises several preconcentration units, each defined by a rank i, i ranging from 1 to n and n being greater than or equal to 2 and comprising several preconcentration units that are linked in series and each defined by a rank j in each series of rank i, with j ranging from 1 to m and m being greater than or equal to 2, and each preconcentration unit of rank j, with j ranging from 1 to m, of a series of rank i is linked by a distinct fluid link with a corresponding preconcentration unit of the same rank j in the series of rank i+1.

According to a particular feature, said matrix comprises n series of preconcentration units with n greater than or equal to 3 each having m preconcentration units with m greater than or equal to 3, and, for all the series of rank i with i ranging from 2 to n−1, the preconcentration units of rank j ranging from 2 to m−1 comprise four fluid pathways to be each linked to the preconcentration unit of the same rank j present in the series of rank i−1 and in the series of rank i+1.

According to another particular embodiment, the network comprises at least one fluid node produced at the link between two adjacent preconcentration units of said first series and the network comprises a first preconcentration unit linked to said fluid node.

According to a particular feature, the network comprises a second preconcentration unit linked to said fluid node.

According to another particular feature, each preconcentration unit is configured to take at least three distinct states, a first state in which the heating means are at a first temperature, a second state in which the heating means are at a second temperature and a third stage in which the heating means are at a third temperature, said third temperature having a value greater than that of the second temperature and said second temperature having a value greater than that of the first temperature.

According to another particular feature, the adsorbent material present in the cavity of each preconcentration unit is of Tenax (registered trade mark) type.

According to another particular feature, at least one preconcentration unit of the network comprises at least one chemical reaction catalyst placed in its cavity.

The invention relates also to a system for controlling a gaseous flow, comprising at least one fluid inlet intended to receive the gaseous flow, said system comprising:
- a fluid network as defined above which is linked to said fluid inlet;
- an assembly for controlling fluid movement in said fluid network; and
- a control unit configured to execute a control sequence comprising control instructions intended for the heating means of each preconcentration unit for said network and for the assembly for controlling fluid movement in said network.

According to a particular feature, the assembly for controlling fluid movement in said network comprises one or more valves arranged in the network and one or more pumps arranged in said network.

According to another particular feature, said control sequence comprises a succession of states taken by each pump, each valve of the assembly for controlling fluid movement and by each of the heating means of each preconcentration unit of the network.

The invention relates also to a method for separating N gaseous compounds present in a gaseous flow, N being greater than or equal to 2, said method being implemented from a fluid network organized in a matrix defined by n=2 and m=2 in which each preconcentration unit is referenced $U_{i,j}$, and the method comprises at least one separation cycle which consists, in each preconcentration unit of the matrix, in:
- trapping at least one first gaseous compound in said gaseous flow in the preconcentration unit and releasing N−1 gaseous compounds of said gaseous flow towards another preconcentration unit of the matrix,
- discharging said first compound present in the preconcentration unit.

BRIEF DESCRIPTION OF THE FIGURES

Other features and advantages will emerge from the following detailed description given in light of the attached drawings in which.

DETAILED DESCRIPTION OF AT LEAST ONE EMBODIMENT

The gaseous flow control system comprises a network R of several interconnected preconcentration units $U_{i,j}$.

A preconcentration unit $U_{i,j}$ makes it possible to accumulate, using an adsorbent, compounds present in an incoming gaseous flow and makes it possible to partially or totally release the gaseous flow, by thermal desorption.

Each preconcentration unit of the network can take the form of a silicon microcomponent.

Figure 2:
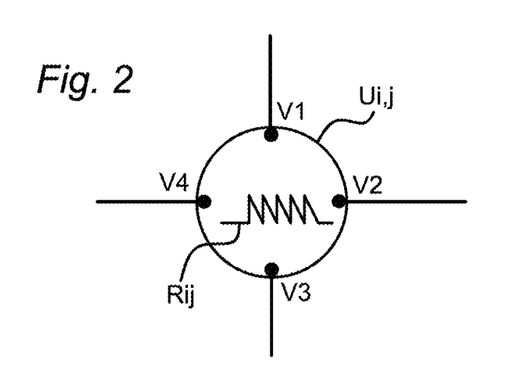
FIG. 2 schematically represents a preconcentration unit employed in the fluid network of the invention.

Referring to FIG. 2, each preconcentration unit $U_{i,j}$ of the network comprises a housing having at least one cavity in which the adsorbent material is placed. In its cavity, each preconcentration unit can comprise a microstructure (for example micropillars) covered by an adsorbent material.

The adsorbent material can be produced in the form of Tenax (registered trade mark) particles or of any other material used conventionally.

Each preconcentration unit $U_{i,j}$ is provided with heating means fixed to its housing. The heating means can be produced in the form of a heating resistor $R_{ij}$ whose temperature $T_{ij}$ can be easily adjusted. A temperature sensor (for example in the form of a measurement resistor) can also be present. Depending on the temperature which is set at the level of a preconcentration unit and the type of adsorbent which is employed in this unit, it is possible to control the gaseous flow and thus to manage the compounds present in the gaseous flow which will be fixed or salted out at the control unit level. Tables in fact make it possible to indicate the compounds which will be fixed or salted out by a preconcentration unit as a function of the nature of the adsorbent used as well as of the temperature set at the unit level.

In a nonlimiting manner there are for example the following data:
- size of a preconcentration unit produced in the form of a silicon component: 10 min×10 mm, silicon, 2 inlets and 2 outlets;
- size of the fluid cavities: 1 µL to 100 µL;
- adsorbent employed of commercial type (registered trade marks): Tenax TA, Tenax GR. Carbostrap, Carbostrap C, Carboxen 569, Carbosieve SIII, etc. and
- typical temperatures used ranging from 0 to 300° C.

It should be noted that all of the fluid network will itself be able to be placed in a thermally controlled enclosure, and so placed in particular in order to avoid the condensation in the fluid links of the network.

Referring to FIG. 2, each preconcentration unit $U_{i,j}$ can comprise at least two fluid pathways V1, V2. "Fluid pathway" is intended to mean an opening through which the gaseous flow can circulate to penetrate into the cavity of the preconcentration unit or exit therefrom. To establish the fluid network, the fluid links of the network are connected to the fluid pathways of the preconcentration units.

Each preconcentration unit can also comprise three fluid pathways V1, V2, V3 or even four fluid pathways V1, V2, V3, V4 of the same type. The number of fluid pathways present on each preconcentration unit will be able to depend on the type of fluid network produced. Obviously, it will be possible to provide a network which comprises preconcentration units which all comprise four fluid pathways and to employ control means (valve+pumps—see below) suited to the targeted application.

Hereinbelow in the description, the fluid pathways of one and the same preconcentration unit are called "first fluid pathway" V1, "second fluid pathway" V2, "third fluid pathway" V3 and "fourth fluid pathway" V4. These are all equivalent and can each be used as inlet or outlet, depending on the direction of circulation of the gaseous flows in the network.

Figure 3:
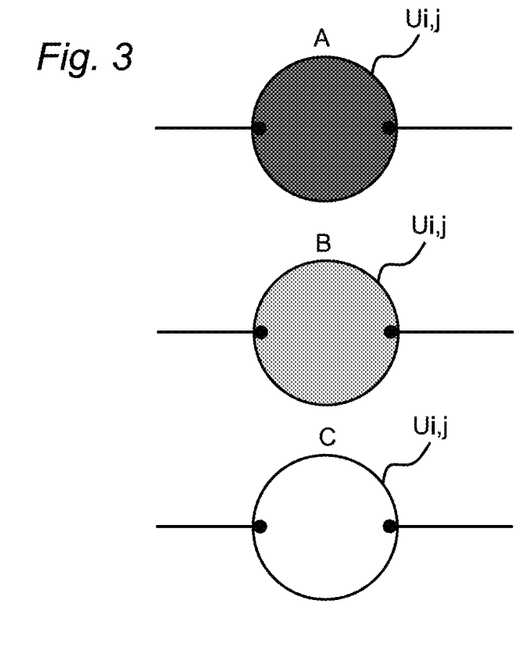
FIG. 3 illustrates three distinct states A, B and C taken by a preconcentration unit.

Referring to FIG. 3, each preconcentration unit $U_{i,j}$ can thus take three states as a function of the temperature which is assigned to it:

A state A, called closed state, obtained at a first, so-called cold temperature T1. In this state, the compounds of the incoming gaseous flow are all trapped in the cavity of the unit and no gaseous flow leaves the cavity.

A state B, called intermediate state, obtained at a second temperature T2, having a higher value than that of the temperature T1. In this state B, some compounds of the incoming gaseous flow are trapped in the cavity and other compounds of the gaseous flow are released by thermal desorption. Depending on the value taken by this temperature T2, the compounds trapped or released may differ.

A state C, called open state, obtained at a third temperature T3 whose value is higher than that of the second temperature T2. In this state, all of the incoming gaseous flow is released and can thus be drawn.

Obviously, the choice of the operating temperatures may differ as a function of the adsorbent material which is employed in the unit and of the compounds which are present in the gaseous flow and that there is a desire to control, that is to say trap or release.

Figure 1:
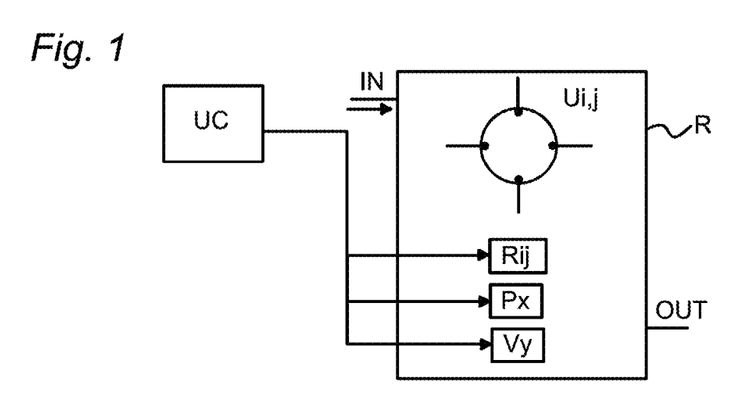
FIG. 1 schematically represents the gaseous flow control system of the invention.

According to a particular aspect of the invention, referring to FIG. 1, the gaseous flow control system also comprises an assembly for controlling the fluid movement in said network. This control assembly is composed primarily of pumps Px and of valves Vy which are positioned appropriately in the network R to ensure the movement of the gaseous flow in the network through fluid links, from one preconcentration unit to another. In replacement of or in addition to the pumps Px, it would also be possible to use a pressurized gas injection system (for example, gas bottles). The gas can then be injected into the fluid network to move the gaseous flows.

The pumps Px are for example positioned relative to the network so as to operate in suction mode. The actuation of a pump Px in effect makes it possible to move a gaseous flow from one point to another of the network. A pump Px will in particular be able to be positioned at the end of each series of preconcentration units of the network in order to control the movement of the gaseous flow from one preconcentration unit of the series to another preconcentration unit of the series. The other movement means employed will be positioned appropriately to favour the movement of the gaseous flows in the network.

The valves are placed so as to control the movement of the gaseous flow in the network R by making it possible to open or close the fluid links of the network. They are for example positioned on each fluid link of the network present between two preconcentration units of the network. The control of the different valves and of the pumps on the network is adapted in particular to the targeted application and to the control to be performed on the gaseous flow.

To control the control assembly detailed above and the heating means of each preconcentration unit, the system can comprise a control unit UC, comprising in particular a microprocessor and several inputs/outputs allowing it to ensure the movement of the gaseous flows in the network according to the targeted application. For the control unit, it thus involves:

controlling the activation or the deactivation of each pump Px in order to control a movement of each gaseous flow in the network;

controlling the opening or the closing of each valve Vy in order to control the movement of each gaseous flow in the fluid links of the network; and controlling the heating means (resistor $R_{ij}$) of each preconcentration unit $U_{i,j}$ to individually adjust the temperature $T_{i,j}$ at each preconcentration unit $U_{i,j}$ and thus control each preconcentration unit into a state A, B or C defined above.

Hereinafter in the description, the terms "to link" and "link" should be understood to include all the solutions which make it possible to have a gaseous flow circulate between two elements of the system. The circulation of the gaseous flow can thus be implemented by employing a pipe, a capillary, a channel hollowed out in a support or any other conventional solution suited to the targeted application. Generally, the term "fluid link" will be employed to express all these possible embodiments.

The network of several preconcentration units $U_{i,j}$ can be produced on one and the same support, for example taking the form of a card.

The system comprises at least one fluid inlet IN to have a gaseous flow enter into the network R and can comprise at least one fluid outlet OUT to partially or totally discharge a gaseous flow out of the network. The fluid inlet IN and the fluid outlet OUT of the system can be combined or linked at one and the same point of the network. Depending on its topology, the network will also comprise one or more controlling fluid links each linked to a pump Px to have the gaseous flows circulate in the network.

The network of preconcentration units $U_{i,j}$ can be more or less complex depending on the operation that is sought to be performed on a gaseous flow.

The fluid network comprises at least one series of several preconcentration units linked in series. Each series of preconcentration units is defined by a rank i, with i ranging from 1 to n and n greater than or equal to 1. Two preconcentration units linked in series means that a fluid pathway of a first preconcentration unit of the series is linked directly to a fluid pathway of a second preconcentration unit of the series. In one and the same series, the preconcentration units that are linked in series are each defined with a rank j, j ranging from 1 to m and m is greater than or equal to 2, which means that the series comprises at least two preconcentration units linked in series. In principle, it is established that the series connection is produced by linking the second fluid pathway of any preconcentration unit of rank j to the first fluid pathway of the adjacent preconcentration unit, that is to say that of rank j+1. Obviously, as stated previously, it is important to remember that all the fluid pathways of a preconcentration unit are equivalent. Each preconcentration unit $U_{i,j}$ will be able to take coordinates i,j which correspond to the series in which it is located and to its rank in said series.

Depending on the topology of the network, one and the same preconcentration unit will be able to form part of several series of preconcentration units linked in series. This will be the case in particular when one and the same preconcentration unit is linked to two distinct preconcentration units in parallel. In this case, the network comprises two series of preconcentration units. With added complexity, it will be seen that the network can comprise several preconcentration units that are interlinked and organized in rows and in columns, thus forming a matrix in which each preconcentration unit is identified in the matrix by the particular coordinates i,j which correspond to its position in the matrix.

In a nonlimiting manner, in each series, the preconcentration unit of rank 1 and/or that of rank m comprises, for each series of preconcentration units of which it forms part, at least one fluid pathway which is linked to a pump Px to allow the movement of the gaseous flow in each of the series of preconcentration units of which it forms part. In other words, a distinct pump Px will be able to be associated with each series of preconcentration units linked in series.

Figure 4:
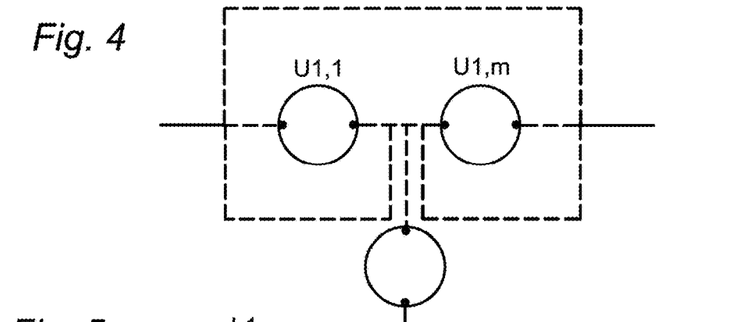
FIG. 4 schematically represents a general configuration of the fluid network of the invention.

FIG. 4 represents a simplified and general version of the fluid network R of the invention.

The principle of the network is in fact to add at least one additional fluid link to at least one series of preconcentration units in series already present, in order to create a new path for a gaseous flow present in the network.

This additional fluid link can thus make it possible to:
circumvent (in other words, short-circuit) a single preconcentration unit of the series or several preconcentration units of the series. This circumvention is produced by linking a fluid pathway of one preconcentration unit of the series to a fluid pathway of another preconcentration unit by circumventing at least one preconcentration unit of the series; and/or
link one preconcentration unit of the series to a fluid inlet or to at least one other preconcentration unit of the network, which is different from those already present in the series so as to form a matrix; this principle will make it possible to create a network of several parallel-connected units of the series.

Starting from these two principles, FIGS. 5 to 18 propose different, more or less complex, network solutions. In all the proposed configurations, in a nonlimiting manner, at least one fluid pathway of a preconcentration unit of the network is linked to the fluid inlet of the system and makes it possible to receive the gaseous flow and one fluid pathway of another preconcentration unit of the network or of the same preconcentration unit of the network can be linked to the fluid outlet of the system, in order to allow the gaseous flow to be discharged. The fluid inlet and outlet can however be combined.

Figure 5:
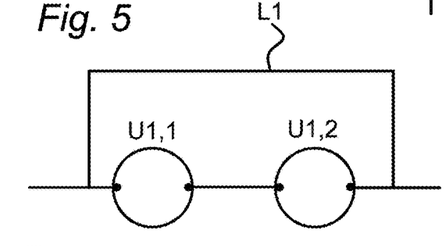
FIGS. 5 to 18 represent other configurations of the fluid network of the invention.

FIG. 5

Two preconcentration units U1,1 and U1,2 of the series are entirely circumvented by a fluid link L1. The second fluid pathway of the second preconcentration unit U1,2 is thus linked directly to the first fluid pathway of the first preconcentration unit U1,1.

Figure 6:
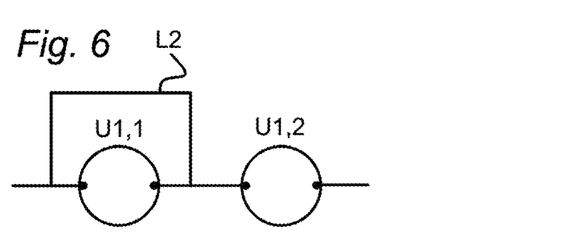

FIG. 6

A single preconcentration unit U1,1 of a series of two preconcentration units is circumvented by a fluid link L2. Its second fluid pathway is thus linked directly to its first fluid pathway.

Figure 7:
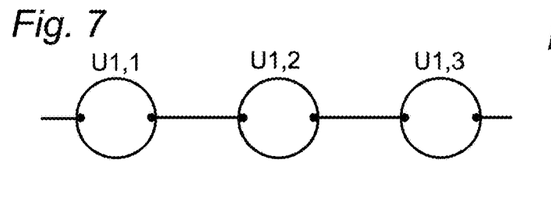

FIG. 7

A series of two preconcentration units U1,1 and U1,2 is linked to an additional preconcentration unit U1,3 of the network, distinct from those of the series. This additional preconcentration unit U1,3 is here linked in series with the preconcentration unit of rank m (m=2 in FIG. 7) of the series, its first fluid pathway being linked to the second fluid pathway of the preconcentration unit of rank m of the series.

Figure 8:
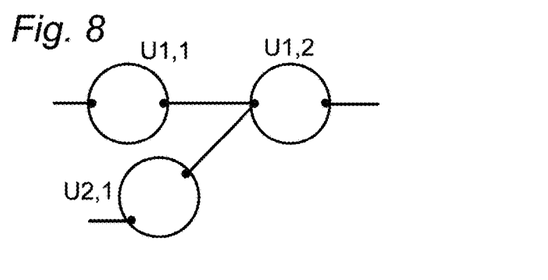

FIG. 8

The series of two preconcentration units in series is linked to an additional preconcentration unit U2,1 of the network, distinct from those of the series. This additional preconcentration unit U2,1 is, here, linked in parallel to at least one preconcentration unit of the series. It thus comprises a fluid pathway linked to the first fluid pathway of one of the preconcentration units of the series which is present at the ranks 1 to m.

Figure 9:
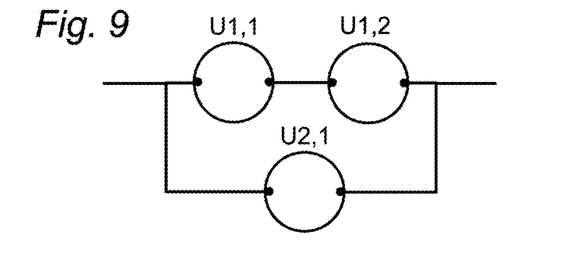

FIG. 9

The series of units of two preconcentration units U1,1 and U1,2 is circumvented through an additional preconcentration unit U2,1 of the network. It therefore involves placing at least one preconcentration unit U2,1 in parallel to those of the series.

Figure 10:
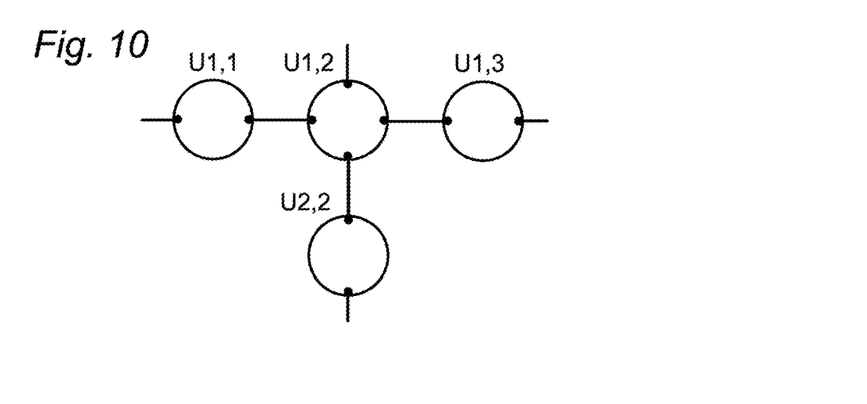

FIG. 10

At least one preconcentration unit U1,2 of the series is provided with a third fluid pathway to which is linked an additional preconcentration unit U2,2 of the network.

Figure 11:
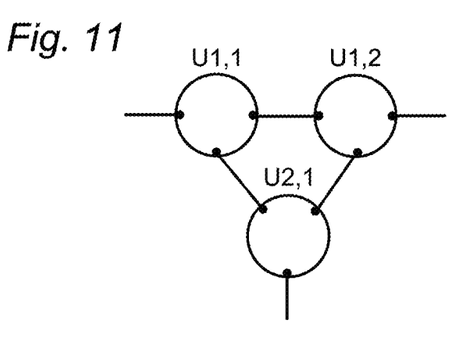

FIG. 11

Two preconcentration units U1,1 and U1,2 of the series each have three fluid pathways. Their third fluid pathway is linked to one and the same other preconcentration unit U2,1 of the network, so as to form a mesh of triangular form. This preconcentration unit U2,1 also comprises three fluid pathways.

Figure 12:
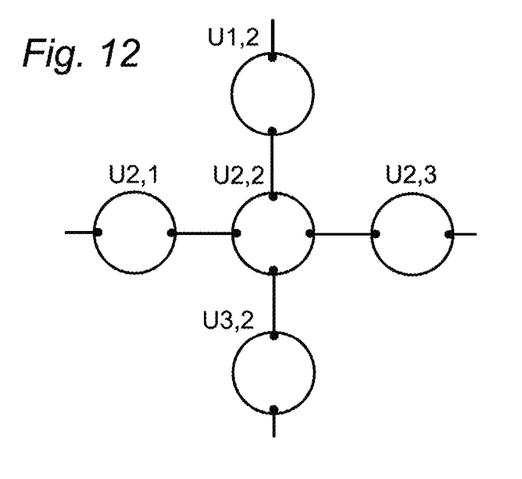

FIG. 12

At least one preconcentration unit U2,2 of the series is provided with a third fluid pathway to which is linked a preconcentration unit U1,2 of the network, different from those of the series, and a fourth fluid pathway to which is also linked another preconcentration unit U3,2 of the network, different from those of the series.

Figure 13:
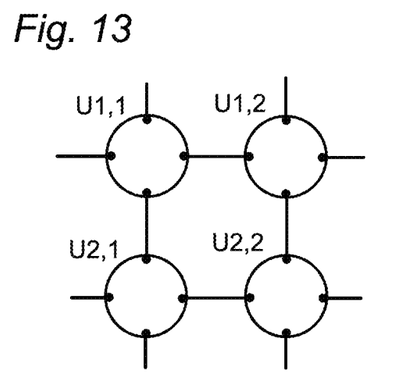

FIG. 13

This involves creating a mesh by connecting, in parallel to at least two preconcentration units U1,1 and U1,2 of the series, at least two other preconcentration units U2,1 and U2,2 of the network.

Figure 14:
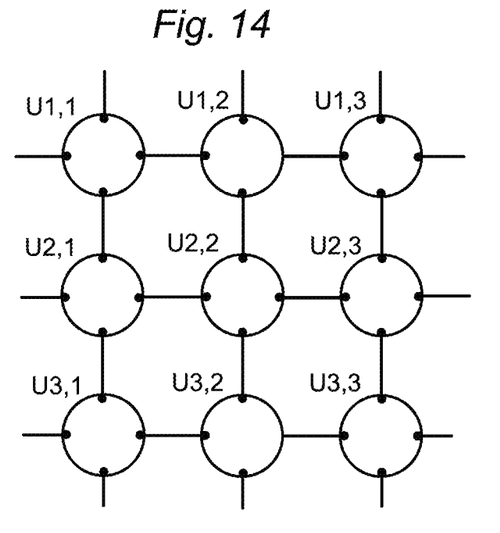

FIG. 14

This involves producing a complete matrix of several preconcentration units. There are thus several series of preconcentration units organized in several identical parallel rows. Each row is identified by the rank i with i ranging from 1 to n, with n greater than or equal to 3. In each row, the preconcentration units are linked in series and defined with a rank j ranging from 1 to m, with m which is greater than or equal to 3. In the matrix, each preconcentration unit can thus be identified by the coordinates i and j, which correspond respectively to the rank of the row in which it is located and to its rank in said row.

In this solution, all the preconcentration units can be identical with four fluid pathways. The mesh of the matrix is thus of parallelepipedal form.

Figure 15:
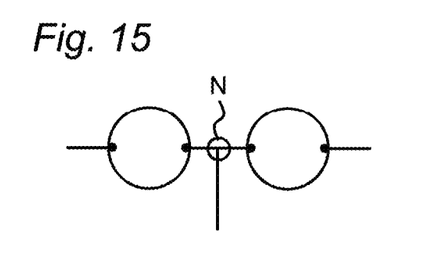

FIG. 15

This involves producing at least one fluid node N in the network on a fluid link present between two preconcentration units in series in a series. The fluid node N can thus short-circuit a link and makes it possible to connect a fluid link forming a fluid inlet or outlet.

Figure 16:
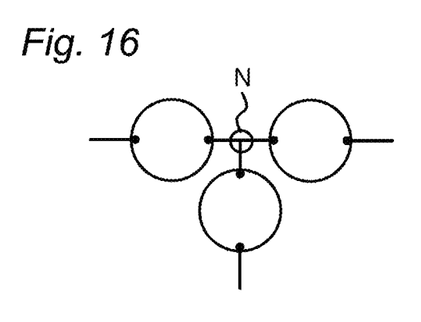

FIG. 16

The fluid node produced in the configuration of FIG. 15 is linked to at least one other preconcentration unit of the network.

Figure 17:
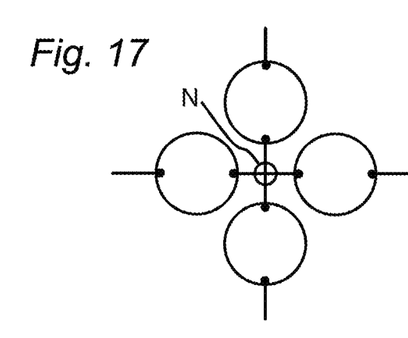

FIG. 17

Relative to the preceding figure, this involves linking an additional preconcentration unit to the fluid node.

Figure 18:
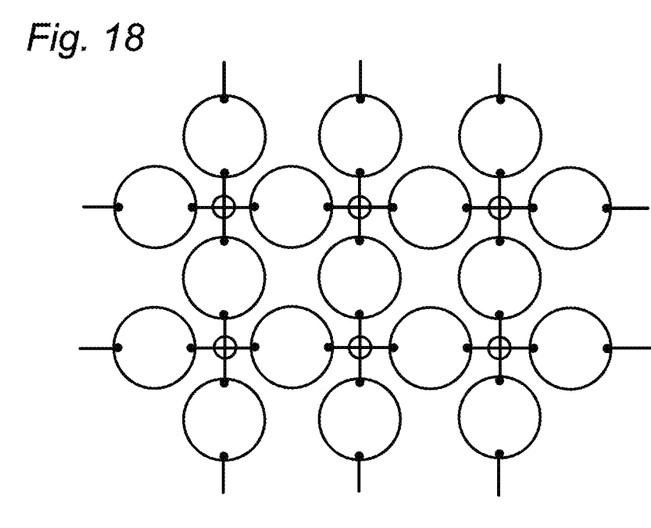

FIG. 18

Starting from the fluid node principle of FIGS. 15 to 17, it is possible to produce a complete matrix with several fluid nodes forming the intersections of the matrix. This configuration is a variant of the matrix of FIG. 14. Suitable control means make it possible in fact to implement a control of the gaseous flow equivalent to that which can be obtained with the matrix of FIG. 14. This configuration makes it possible to employ preconcentration units which have only two fluid pathways.

Starting from the different configurations described above, FIGS. 19 to 22 illustrate different operations that can be implemented from some of the configurations of the fluid network which have been described above. In these figures, the positions taken in the network by each distinct gaseous compound C1, C2, C3 are represented by a coloured rectangle (black, dark grey or light grey).

Figure 19:
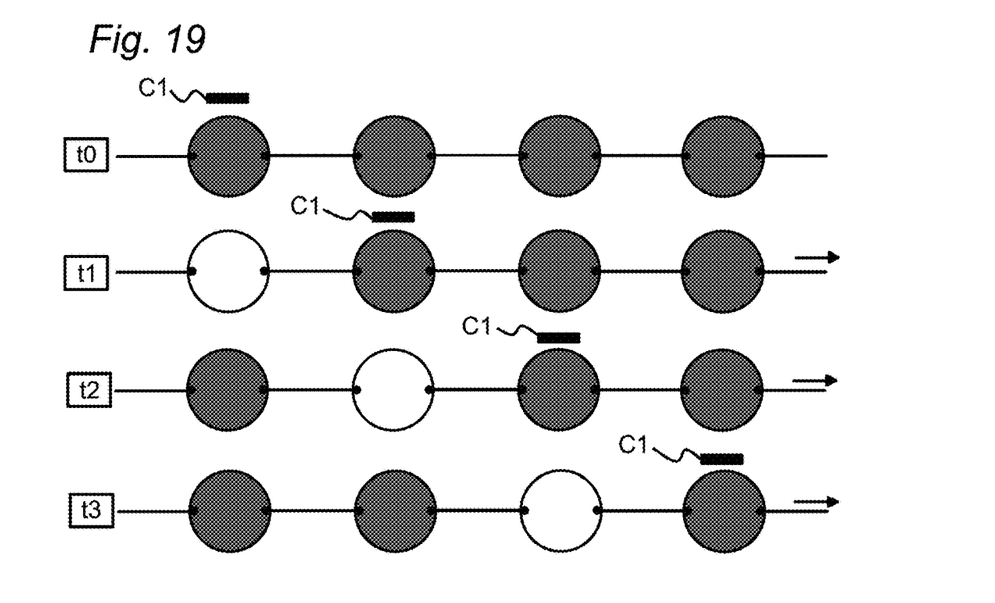
FIGS. 19 to 22 illustrate solutions of operations implemented in different configurations of the fluid network of the invention.

FIG. 19

FIG. 19 illustrates the principle of movement of a gaseous compound C1 in a series of four preconcentration units linked in series.

At t0, all the preconcentration units are in the closed state A. The gaseous compound is trapped in the first preconcentration unit U1,1 of the series.

At t1, the first preconcentration unit U1,1 is heated so as to switch to the open state C. A control of the pump, associated with the series of preconcentration units, makes it possible to pass the gaseous compound C1 into the second preconcentration unit U1,2 of the series. Since the second preconcentration unit U1,2 is in the closed state A, the gaseous compound is trapped in this second preconcentration unit.

The same principle is reproduced at the instants t2 and t3, thus making it possible to pass the gaseous compound to the fourth preconcentration unit U1,4 of the series.

Figure 20:
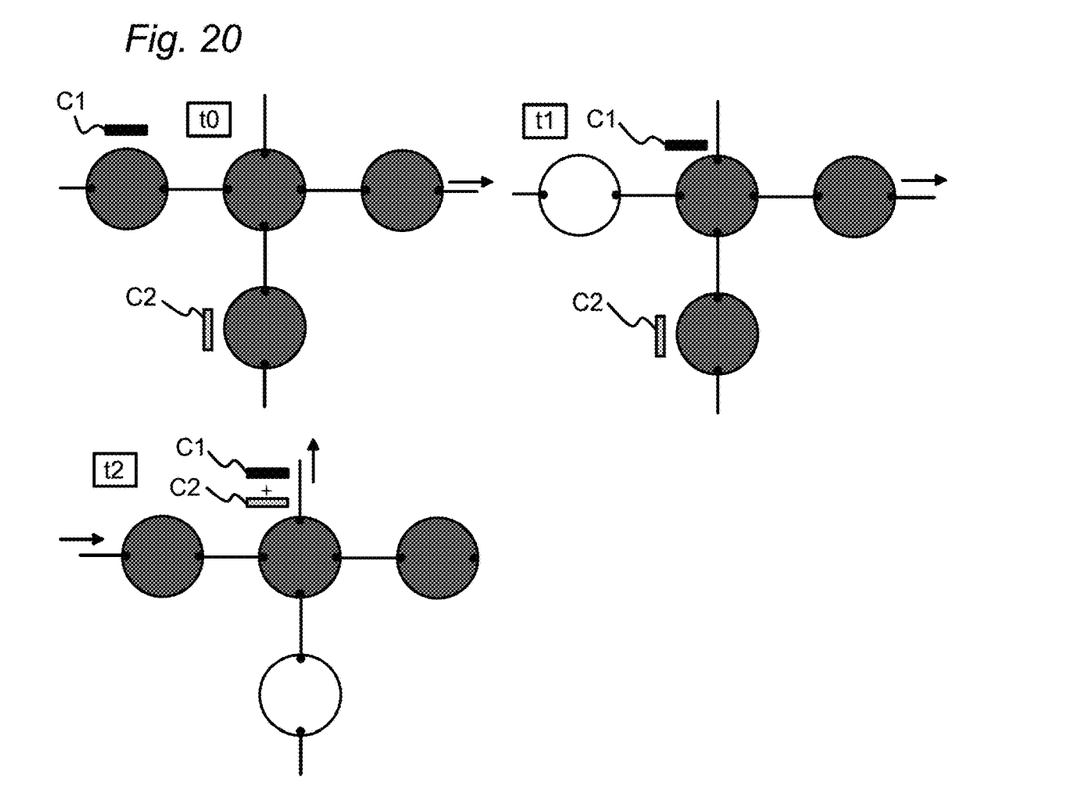

FIG. 20

FIG. 20 illustrates the principle of addition of two distinct gaseous compounds C1, C2 using a network which comprises a first series of three preconcentration units U1,1, U1,2, U1,3 linked in series and a second series of two preconcentration units linked in series, this second series being created by employing the preconcentration unit of rank 2 of the first series. A first gaseous compound C1 is injected into the first series of preconcentration units and a second gaseous compound C2 is injected into the second series of preconcentration units.

At t0, the preconcentration units of the first series and those of the second series are all in the closed state A. The first gaseous compound C1 is trapped in the preconcentration unit U1,1. The second gaseous compound C2 is trapped in the preconcentration unit of coordinates U2,2.

At t1, the preconcentration unit U1,1 is heated so as to switch to the open state C. A pump is activated, making it possible to pass the first gaseous compound C1 into the preconcentration unit U1,2. The first gaseous compound C1 is then trapped in the preconcentration unit U1,2.

At t2, the preconcentration unit U2,2 is controlled to the open state C. A pump is actuated making it possible to pass the second gaseous compound C2 into the preconcentration unit U1,2. The first gaseous compound and the second gaseous compound are then both trapped in the preconcentration unit U1,2.

Figure 21:
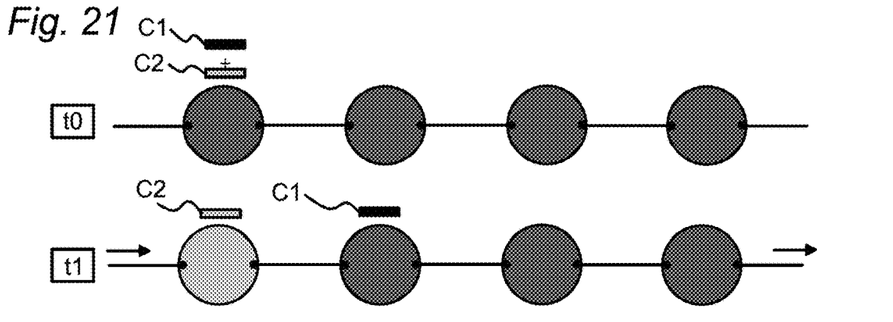

FIG. 21

FIG. 21 illustrates the principle of separation/subtraction between two gaseous compounds C1, C2 present in one and the same flow. It is implemented by using a series of several preconcentration units linked in series.

At t0, all the preconcentration units are in the closed state A. The two gaseous compounds C1, C2 are trapped in the first preconcentration unit U1,1 of the series.

At t1, the first preconcentration unit U1,1 is heated to the temperature T2 allowing it to enter into the intermediate state B. In this configuration, only the first gaseous compound C1 is released and joins, under the action of a pump, the second preconcentration unit U1,2 of the series. The second gaseous compound C2 remains trapped in the first preconcentration unit U1,1.

Figure 22:
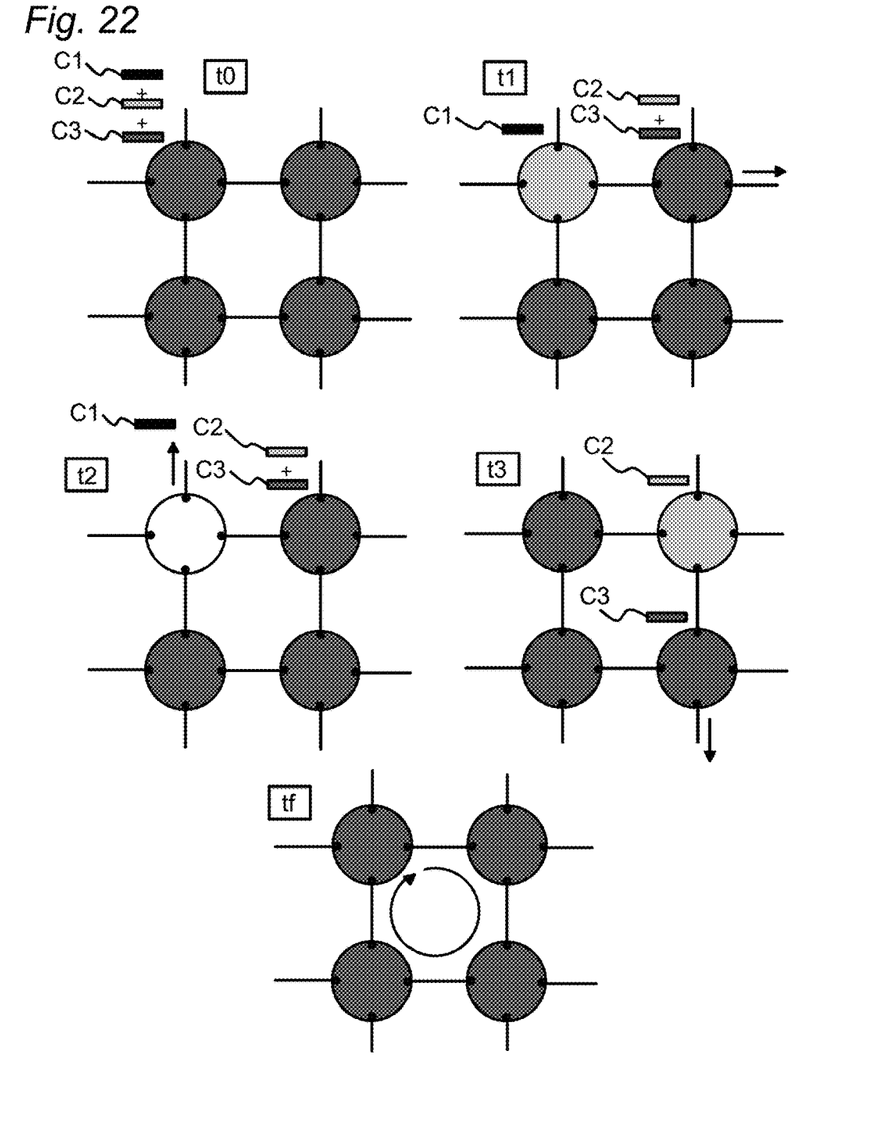

FIG. 22

FIG. 22 illustrates a principle of separation by dichotomy between several gaseous compounds (N gaseous compounds) present in one and the same flow. For that, four preconcentration units are used that are interlinked to form a mesh such as that represented in FIG. 13.

At t0, all the preconcentration units are in the closed state A and three distinct gaseous compounds C1, C2, C3 are trapped in the preconcentration unit U1,1.

At t1, the preconcentration unit U1,1 is heated to switch into an intermediate state B. A pump is actuated making it possible to suck the second gaseous compound C2 and the third gaseous compound C3 to the preconcentration unit U1,2. The first gaseous compound C1 remains trapped in the first preconcentration unit U1,1 of the matrix.

At t2, the preconcentration unit U1,1 is switched into the open state C making it possible to release the first gaseous compound C1. A pump is actuated to suck the first gaseous compound C1 out of the network formed by the mesh.

At t3, the preconcentration unit U1,2 is heated to the temperature T2 to switch into an intermediate state B (which is different from the intermediate state obtained for the preconcentration unit U1,1), making it possible to release the third gaseous compound C3 while retaining the second gaseous compound C2. A pump is actuated in order to suck the third gaseous compound C3 to the preconcentration unit U2,2. The second gaseous compound C2 remains trapped in the preconcentration unit U1,2.

The next step is to discharge the second gaseous sample from the preconcentration unit U1,2. If the gaseous flow comprises another gaseous compound, it is possible to separate it by using the preconcentration unit U2,2 then the preconcentration unit U2,1 then to recommence each cycle by restarting from the preconcentration unit U1,1. It is possible to conduct several successive cycles (up to tf) in order to separate the N gaseous compounds present in one and the same gaseous flow. It simply involves controlling each preconcentration unit into the appropriate intermediate state to target the compounds to be trapped and those to be released.

Recursively, for example by stringing together such cycles, it is therefore possible to separate by dichotomy and detect the different separated gaseous compounds. It should be noted that some compounds extracted from the loop can be reinjected into the loop so as, for example, to ensure a finer separation by molecular weight, by more finely adjusting the temperatures of the preconcentration units.

It will be understood that it therefore involves recursively turning a sample while gradually varying the temperatures of the preconcentration units in order to ensure a separation on chip, thus, originally, producing a "digital chromatography". Obviously, it would be possible to apply the same principle to a larger mesh, that is to say which comprises more than four preconcentration units.

According to a particular aspect of the invention, each sequence of control of the movement of the gaseous flows in a network is implemented by the control unit. The sequence consists of a series of instructions comprising the state of each component of the system, in particular the open/closed state of each valve, the temperature level assigned to each preconcentration unit of the network and the state of each pump, active or inactive, to generate or not generate the movement of the gaseous flows in the network as appropriate.

In a nonlimiting manner, it should also be noted that:

- each preconcentration unit is advantageously held in suspension by a support (for example a printed circuit) so as to minimize the heat transfers and the heat capacity of the component. This makes it possible to maintain the rapid thermal responses of the components (for example variation of 200° C. in 10 s by using a 12 V and 2 A power supply).
- It is possible to envisage using the preconcentration units described above to conduct chemical reactions. For example, mixing an alcohol and a carboxylic acid and making them react in a preconcentration unit in order to perform an esterification. This type of reaction for example is possible on a solid support, as described in the literature.
- It is possible to implement the chemical reactions in a preconcentration unit so as, for example, to assist in characterizing the presence of chemical functions on the molecules analysed. In the case of a carboxylic acid for example: the weight of the molecule and its adsorption/desorption properties with an adsorbent phase will be modified after esterification. By comparing the adsorption/desorption properties of the molecule before/after reaction (by analysing for example whether it is necessary to modify the temperature limit of a preconcentration unit to render it passing), it will therefore be possible to confirm the presence of a carboxylic acid function.
- The preconcentration units each contain a cavity which can use one or more types of adsorbent materials, chosen according to the analytes studied. These adsorbent materials can also contain catalysts in order to produce chemical reactions on a solid support.
- One/several of the outlets of the network can be connected to a detector (for example of micro-TCD—thermo-conduction detector—type) so as to detect and quantify the gaseous compounds sent to this outlet. It is also possible to incorporate a gas detector (of micro-TCD type for example) on each fluid pathway between two preconcentration units in order to track the movements of the gaseous compounds in the network and to quantify said gaseous compounds.

Such a control system can thus be employed for numerous applications, including the preparation of gaseous samples, the production of micro-reactions/micro-plants or the analysis of gaseous compounds.

It will also be able to be employed to store a set of several gaseous compounds. After separation (for example according to the method described above in relation to FIG. 22), each gaseous compound is stored in a distinct preconcentration unit of the network.

It will thus be possible to associate therewith detection solutions, for example of gas chromatography type.

The invention claimed is:

1. A fluid network for controlling a gaseous flow comprising:
    a fluid inlet and a fluid outlet; and
    several preconcentration units, each preconcentration unit of said network comprising:
        a cavity filled with an adsorbent material,
        at least one first fluid pathway emerging in said cavity,
        at least one second fluid pathway emerging in said cavity, and
        means for heating said cavity,
    wherein, between the fluid inlet and the fluid outlet, the network comprises:
        at least one first series of several preconcentration units that are linked in series, said preconcentration units of said first series being each defined by a rank j, with j ranging from 1 to m and m being greater than or equal to 2; and
        one or more other preconcentration units linked in parallel to the preconcentration units of said first series to form a matrix and/or form an additional fluid link for short-circuiting one or more preconcentration units of the first series,
    wherein the fluid network is configured to control the gaseous flow to move from a cavity of one of the preconcentration units of the first series to a cavity of one of the other preconcentration units and bypass a cavity of another one of the preconcentration units of the first series.

2. The fluid network according to claim 1, wherein said first series comprises m preconcentration units, with m equal to at least three, and at least one preconcentration unit present from rank 2 to m−1 comprises a third fluid pathway linked to another preconcentration unit of the network, distinct from the preconcentration units of the first series.

3. The fluid network according to claim 1, wherein said first series of preconcentration units comprises m preconcentration units, with m equal to at least three, and at least one preconcentration unit present from rank 2 to m−1 of said first series comprises a third fluid pathway linked to a first preconcentration unit of the fluid network distinct from the preconcentration units of the first series and a fourth fluid pathway linked to a second preconcentration unit of the fluid network distinct from the preconcentration units of the first series and from said first preconcentration unit.

4. The fluid network according to claim 1, wherein said matrix comprises several series of preconcentration units, each defined by a rank i, i ranging from 1 to n and n being greater than or equal to 2 and comprising several preconcentration units that are linked in series and each defined by a rank j in each series of rank i, with j ranging from 1 to m and m being greater than or equal to 2, and wherein each preconcentration unit of rank j, with j ranging from 1 to m, of a series of rank i is linked by a distinct fluid link with a corresponding preconcentration unit of the same rank j in the series of rank i+1.

5. The fluid network according to claim 4, wherein said matrix comprises n series of preconcentration units with n being greater than or equal to 3, each having m preconcentration units with m greater than or equal to 3, and wherein, for all series of rank i with i ranging from 2 to n−1, preconcentration units of rank j ranging from 2 to m−1 comprise four fluid pathways each to be linked to a preconcentration unit of same rank j present in series of rank i−1 and in series of rank i+1.

6. The fluid network according to claim 1, wherein the fluid network comprises at least one fluid node produced at a link between two adjacent preconcentration units of said first series and wherein the fluid network comprises a first preconcentration unit linked to said fluid node.

7. The fluid network according to claim 6, wherein the fluid network comprises a second preconcentration unit linked to said fluid node.

8. The fluid network according to claim 1, wherein each preconcentration unit is configured to take at least three distinct states, a first state in which the means for heating are at a first temperature, a second state in which the means for heating are at a second temperature and a third state in which the means for heating are at a third temperature, said third temperature having a value greater than the second temperature and said second temperature having a value greater than the first temperature.

9. The fluid network according to claim 1, wherein each preconcentration unit is suspended by a support.

10. The fluid network according to claim 1, wherein at least one preconcentration unit of the fluid network comprises at least one chemical reaction catalyst placed in the cavity of the at least one preconcentration unit.

11. A system configured for controlling a gaseous flow, comprising at least one fluid inlet configured to receive the gaseous flow, wherein the system comprises:
- the fluid network as defined in claim 1 linked to said fluid inlet;
- an assembly for controlling fluid movement in said fluid network; and
- a control processor configured to execute a control sequence comprising control instructions for controlling the means for heating of each preconcentration unit of said fluid network and for controlling the assembly controlling the fluid movement in said fluid network.

12. The system according to claim 11, wherein the assembly for controlling the fluid movement in said fluid network comprises one or more valves arranged in the fluid network and one or more pumps arranged in said fluid network.

13. The system according to claim 12, wherein said control sequence comprises a succession of states taken by each pump and each valve of the assembly for controlling fluid movement, and by each of the means for heating of each preconcentration unit of the fluid network.

14. A method for separating N gaseous compounds present in a gaseous flow, N being greater than or equal to 2, wherein the method is implemented by the fluid network according to claim 1, organized in the matrix, and wherein the method comprises at least one separation cycle which consists, in each preconcentration unit of the matrix, in:
- trapping at least one first gaseous compound of said gaseous flow in the preconcentration unit and releasing N−1 gaseous compounds of said gaseous flow towards another preconcentration unit of the matrix; and
- discharging said first gaseous compound present in the preconcentration unit.

* * * * *

UNITED STATES PATENT AND TRADEMARK OFFICE
CERTIFICATE OF CORRECTION

| | |
|---|---|
| PATENT NO. | : 11,371,967 B2 |
| APPLICATION NO. | : 16/421813 |
| DATED | : June 28, 2022 |
| INVENTOR(S) | : Bertrand Bourlon |

It is certified that error appears in the above-identified patent and that said Letters Patent is hereby corrected as shown below:

In the Claims

In Column 12, Claim 2, Line 25, delete "in" and insert -- m --, therefor.

Signed and Sealed this
Tenth Day of January, 2023

Katherine Kelly Vidal
*Director of the United States Patent and Trademark Office*